United States Patent
Ono (10) Patent No.: US 9,115,804 B2
(45) Date of Patent: Aug. 25, 2015

(54) SHIFT RANGE SWITCHING APPARATUS

(71) Applicant: MITSUBISHI ELECTRIC CORPORATION, Chiyoda-ku, Tokyo (JP)

(72) Inventor: Takahiko Ono, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/328,902

(22) Filed: Jul. 11, 2014

(65) Prior Publication Data

US 2015/0142283 A1    May 21, 2015

(30) Foreign Application Priority Data

Nov. 15, 2013  (JP) .................................. 2013-236437

(51) Int. Cl.
   *F16H 61/02*   (2006.01)
   *F16H 61/68*   (2006.01)

(52) U.S. Cl.
   CPC ............ *F16H 61/0213* (2013.01); *F16H 61/68* (2013.01)

(58) Field of Classification Search
   CPC .................... F16H 61/68; F16H 2061/1292
   See application file for complete search history.

(56) References Cited

U.S. PATENT DOCUMENTS

| 2006/0276300 | A1  | 12/2006 | Kashiwagi et al. |
| 2009/0055059 | A1* | 2/2009  | Jerger et al. ..................... 701/51 |
| 2009/0233765 | A1* | 9/2009  | Tao et al. ....................... 477/127 |
| 2012/0029777 | A1* | 2/2012  | Tao et al. ........................ 701/60 |
| 2012/0123653 | A1  | 5/2012  | Kimura et al. |
| 2013/0110364 | A1* | 5/2013  | Yamada et al. ................. 701/61 |

FOREIGN PATENT DOCUMENTS

| JP | 2000-240774 A | 9/2000 |
| JP | 2006-336840 A | 12/2006 |
| JP | 2012-107655 A | 6/2012 |

OTHER PUBLICATIONS

Communication dated Aug. 26, 2014, issued by the Japanese Patent Office in counterpart Japanese application No. 2013-236437.

* cited by examiner

*Primary Examiner* — Edwin A Young (74) *Attorney, Agent, or Firm* — Sughrue Mion, PLLC; Richard C. Turner (57) ABSTRACT

There is provided a shift range switching apparatus that can perform appropriate fail-safe control when a power source supplied to an electronically controlled shift range switching apparatus is instantaneously interrupted. When due to instantaneous interruption of a power source supplied to the shift range switching apparatus, the shift range switching apparatus is reactivated, a target shift range is determined based on a rotation position of a detent plate detected by a detent position sensor immediately after the reactivation, and the rotation position of the detent plate is controlled.

7 Claims, 7 Drawing Sheets

SHIFT RANGE SWITCHING APPARATUS

BACKGROUND OF THE INVENTION

1. Field of the Invention

The present invention relates to an electronically controlled shift range switching apparatus that switches the shift ranges of an automatic transmission by driving an actuator and particularly to a shift range switching apparatus that can perform fail-safe control when a power source supplied to the shift range switching apparatus is instantaneously interrupted.

2. Description of the Related Art

In recent years, electronically controlled shift range switching apparatuses for switching the shift ranges of an automatic transmission by driving an actuator including an electric motor have been put to practical use. In such a shift range switching apparatus, there exists no mechanical coupling between a shift range setting means (in general, an input operation unit that is referred to as a "shift lever" or a "selector lever") for a driver to perform shift range switching operation and a shift range switching mechanism (a mechanism for mechanically shifting in a sliding manner a manual spool valve that switches the hydraulic pressure circuits in an automatic transmission apparatus, in accordance with a shift range selected by the driver); therefore, the degree of flexibility in the vehicle mountability of the shift range setting means is raised. Moreover, the configuration of the shift range setting means can freely be designed; thus, a shift range setting means such as a "touch panel", a "push button", or a "jog lever", which has a high operability in terms of human engineering, is widely utilized.

In such a shift range switching apparatus, in accordance with a demanded shift range that is outputted from the shift range setting means, due to shift range switching operation by a driver, the actuator is controlled in such a way that the real shift range coincides with the demanded shift range; therefore, in the control of shift range switching, it goes without saying that two information items, i.e., the demanded shift range (target shift range) and the real shift range (actual shift range), which is the result of control of the actuator, are extremely important.

In general, an electronically controlled shift range switching apparatus is actuated after receiving a power source from a vehicle battery; therefore, instantaneous power interruption (energization is instantaneously interrupted) may occur, due to some sort of unexpected cause (e.g., unexpected loose connection of electric wiring leads).

In a conventional mechanical shift range switching apparatus, a driver's operational force switches shift ranges, through a mechanical transfer mechanism such as a shift cable or a shift rod; therefore, as long as the mechanical coupling is not broken, the shift range (the target shift range) set through the driver's switching operation of the mechanical shift lever and the real shift range (actual shift range) realized through the operation of the shift range switching mechanism securely coincide with each other.

However, an electronically controlled shift range switching apparatus has no mechanical coupling between the shift range setting means and the shift range switching mechanism; therefore, after being actuated again due to instantaneous power interruption, the electronically controlled shift range switching apparatus may lose information indicating the target shift range or the real shift range and may be prevented from normally functioning.

Accordingly, for example, in Patent Document 1, fail-safe control for coping with the re-activation is proposed in which a storage (a nonvolatile storage that can maintain data even when the power source is shut down) that does not lose data even when the power is instantaneously interrupted is utilized and the output axle position of the actuator (the positional information related to the real shift range) is always stored, "so that when due to instantaneous power interruption, the shift range switching apparatus is actuated again, control is continued by use of the output axle position of the actuator stored in the nonvolatile storage, under the condition that the electric motor has not been driven before the instantaneous interruption of the power source" or "the range demand value to be outputted from the shift range setting means is set to the output axle position of the actuator stored in the nonvolatile storage and then control is continued, under the condition that the electric motor has not been driven before the instantaneous interruption of the power source".

As far as the shift range setting means for a driver to switching the shift ranges is concerned, a momentary-type input device such as a "touch panel", a "push button", or a "jog lever" has predominantly been utilized in recent years. For example, Patent Document 2 discloses a shift range setting means utilizing a touch panel; when respective portions of the touch panel, at which D Range (forward travel range), N Range (non-travel range), R Range (retreat travel range), and P Range (non-travel range and parking lock operation) are displayed, are softly touched by a fingertip, the shift range selected by a driver is outputted, as the demanded shift range, from the shift range setting means.

Accordingly, it is required to electrically store at least the demanded shift range until after the demanded shift range is outputted by the shift range setting means, the actuator is controlled and then the real shift range coincides with the demanded shift range.

However, when due to instantaneous power interruption, the shift range switching apparatus is actuated again, information indicating the demanded shift range is lost and hence the shift range switching apparatus may not be able to function normally; thus, as is the case with Patent Document 1, described above, it is required to utilize a nonvolatile storage is utilized so that the information indicating the demanded shift range is constantly stored. As a result, even when due to instantaneous power interruption, the shift range switching apparatus is actuated again, the control utilizing the demanded shift range stored in the nonvolatile storage can be continued.

PATENT DOCUMENT

[Patent Document 1] Japanese Patent Application Laid-Open No. 2006-336840

[Patent Document 2] Japanese Patent Application Laid-Open No. 2000-240774

The fail-safe control proposed in Patent Document 1 can be implemented when the electric motor has not been driven before the power source is instantaneously interrupted. However, it can be anticipated that instantaneous power interruption occurs not only when the electric motor has not been driven but also when the electric motor is being driven. Thus, provided the power source is instantaneously interrupted when the electric motor is being driven, i.e., when the shift ranges are being switched, the proposed fail-safe control is not implemented; therefore, the real shift range may become unstable and uncontrollable, or the real shift range may be erroneously controlled so as to become a shift rang that is not selected by the driver. Moreover, the cumulative data rewriting count of a nonvolatile storage is limited; therefore, because in order to cope with frequent data rewriting, it is required to select a nonvolatile storage of a higher-reliability specification, the costs may increase.

SUMMARY OF THE INVENTION

The present invention has been implemented in consideration of the foregoing problems; the objective thereof is to provide a shift range switching apparatus, among electronically controlled shift range switching apparatus that switch the shift ranges of an automatic transmission by driving an actuator, that can inexpensively realize appropriate fail-safe control when being actuated again, due to instantaneous power interruption.

In a shift range switching apparatus according to the present invention, when due to instantaneous interruption of the power source supplied to the shift range switching apparatus, the shift range switching apparatus is reactivated, a target shift range is determined in accordance with the rotation position of a detent plate detected by a detent position sensor immediately after the reactivation; then, the control of switching the shift ranges is continued.

In the present invention, when due to instantaneous interruption of the power source supplied to the shift range switching apparatus, the shift range switching apparatus is reactivated, a target shift range is determined in accordance with the rotation position of a detent plate detected by a detent position sensor immediately after the reactivation; then, the control of switching the shift ranges is continued; therefore, a fail-safe mechanism that is appropriate when the shift range switching apparatus is reactivated can be provided.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

An electronically controlled shift range switching apparatus is an apparatus that determines a shift range (demanded shift range) selected by a driver to be a target shift range, drives an actuator, and changes the respective operational positions of a shift range switching mechanism and a parking switching mechanism mounted in an automatic transmission (unillustrated) so as to switch the hydraulic pressure controller in the automatic transmission to the hydraulic path corresponding to the target shift range, thereby switching the shift ranges of the automatic transmission.

With reference to the accompanying drawings, preferred embodiments of a shift range switching apparatus according to the present invention will be explained below.

Figure 1:
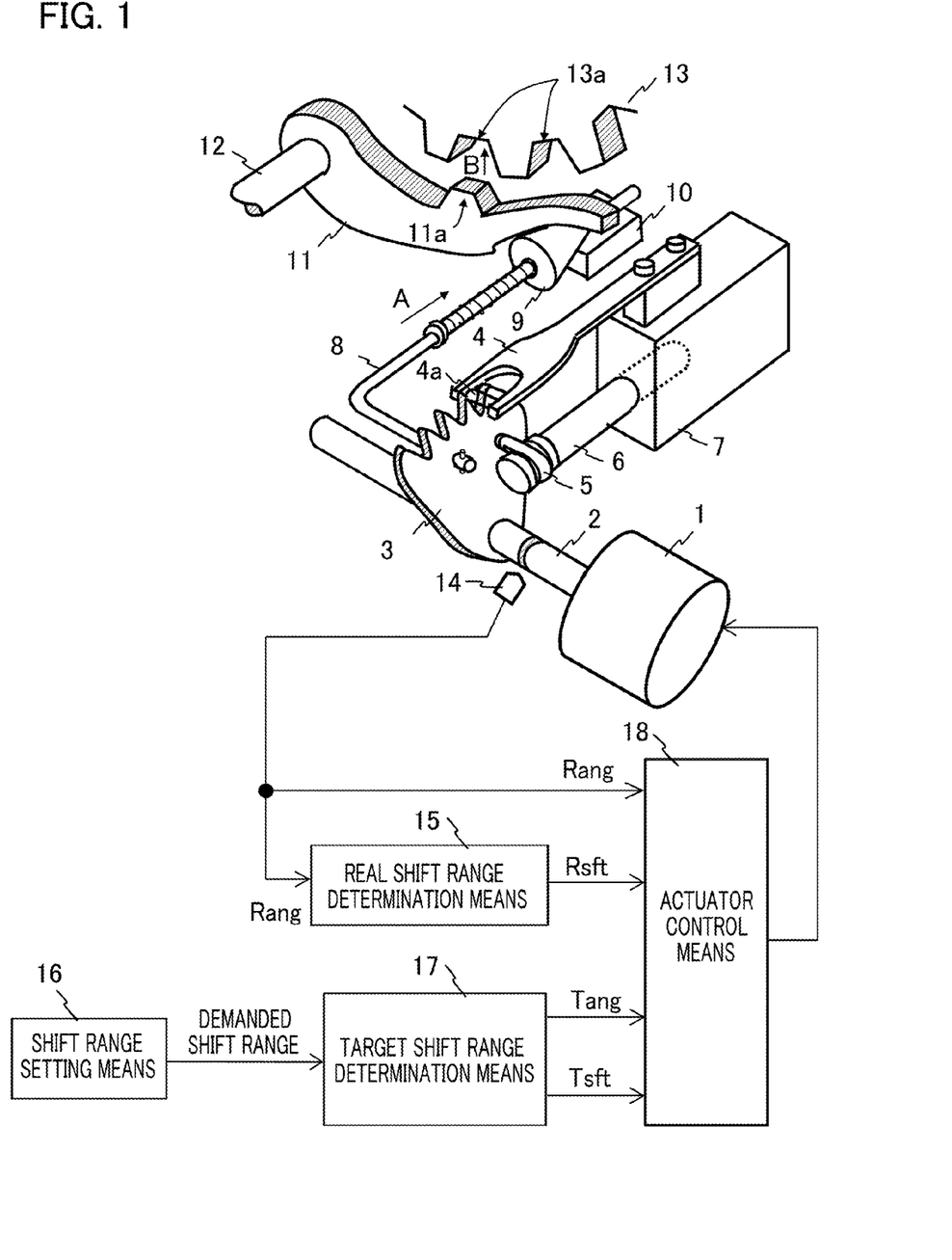
FIG. 1 is an overall configuration diagram for explaining the outline of a shift range switching apparatus according to Embodiment 1 of the present invention.

FIG. 1 is an overall configuration diagram for explaining the outline of a shift range switching apparatus according to the present invention. In FIG. 1, an actuator 1 is configured with an electric motor (unillustrated) and a speed reducer (unillustrated) that decelerates and outputs the rotation of the electric motor; a rotation axle 2, which adjoin the actuator 1 in such a way as to extend the output axle of the actuator 1, extracts the rotation output of the actuator 1 toward the outside.

An approximately sector-shaped detent plate 3 is mounted on the rotation axle 2; when the actuator 1 is driven and hence the rotation axle 2 pivots by a predetermined angle, the detent plate 3 also changes its rotation position by the predetermined angle with respect to the junction point, as the center axis, between the rotation axle 2 and the detent plate 3.

Two or more recesses are provided in the arc portion of the detent plate 3; an engagement portion 4a provided at the front end of a detent spring 4 fixed to a hydraulic controller 7 engages with any one of the two or more recesses in accordance with the rotation position of the detent plate 3, so that the rotation position of the detent plate 3 is maintained.

Next, the operation of the detent plate 3 configured in such a way as describe above will be explained in detail with reference to FIG. 2.

Figure 2:
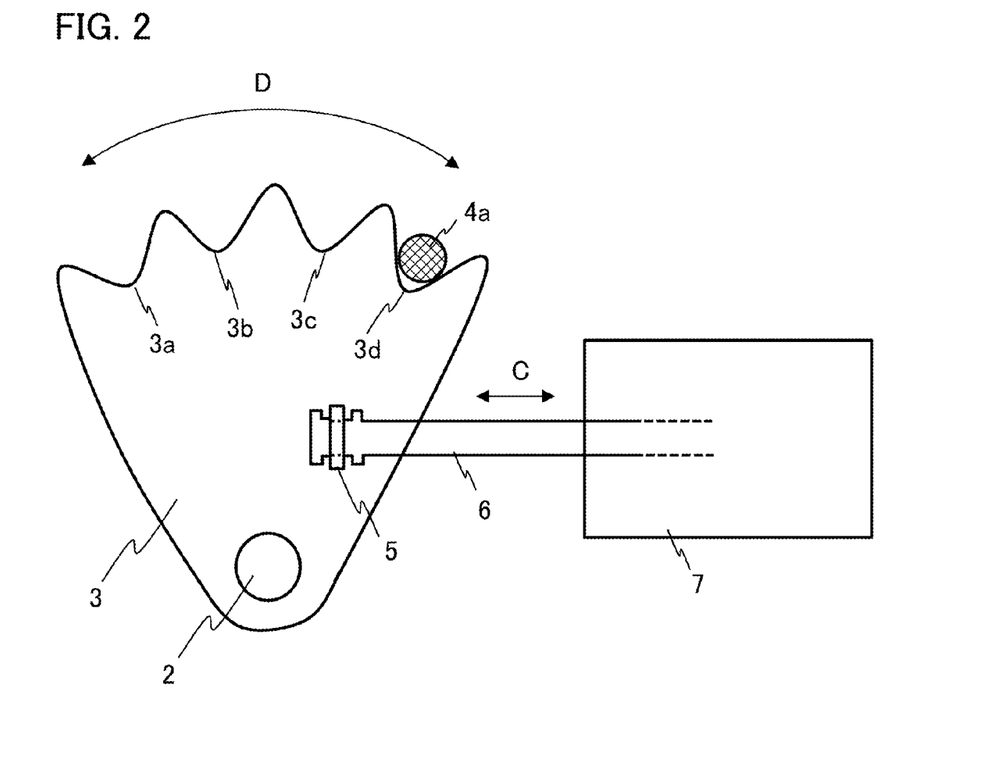
FIG. 2 is an enlarged view of a detent plate for explaining the operation of the detent plate in a shift range switching apparatus according to Embodiment 1 of the present invention.

FIG. 2 is an enlarged view of the detent plate 3. Recesses 3a, 3b, 3c, and 3d are provided in the arc portion of the approximately sector-shaped detent plate 3; the engagement portion 4a provided at the front end of the detent spring 4 engages with any one of the recesses 3a, 3b, 3c, and 3d in accordance with the rotation position of the detent plate 3, so that the rotation position of the detent plate 3 is maintained.

In general, the four recesses 3a, 3b, 3c, and 3d provided in the detent plate 3 are preliminarily designed as the rotation positions with which the automatic transmission realizes P Range (non-travel range and parking lock operation), R Range (retreat travel range), N Range (non-travel range), and D Range (forward travel range), respectively.

A pin 5 for moving a shift range switching mechanism 6 is mounted in the side face of the detent plate 3. The pin 5 engages with the left end portion of the shift range switching mechanism 6; when the rotation axle 2 rotates and hence the detent plate 3 is rotated, the pin 5 is driven in an arc-shaped manner, so that the shift range switching mechanism 6 performs linear motion (travel indicated by the bidirectional arrow C in FIG. 2) in the hydraulic controller 7.

In the situation illustrated in each of FIGS. 1 and 2, the engagement portion 4a at the front end of the detent spring 4 is engaged with the recess 3d provided at the rightmost end of the approximately sector-shaped arc portion of the detent plate 3 so as to maintain the rotation position of the detent plate 3; In this situation, the shift range switching mechanism 6 is most shallowly inserted into the hydraulic controller 7; in the hydraulic controller 7, a hydraulic path for realizing D Range is established and hence the automatic transmission is controlled so as to be D Range.

When in the foregoing situation in which the automatic transmission is set to D Range, the rotation axle 2 is rotated clockwise (rightward) by a predetermined angle out of the bidirectional arrow D in FIG. 2, the rotation position of eh detent plate 3 changes in synchronization with the rotation of the rotation axle 2; therefore, the engagement portion 4*a* at the front end of the detent spring 4 escapes from the recess 3*d* for D Range, moves to the recess 3*c* for N Range provided at the left side of the recess 3*d*, and then maintains the rotation position. In this particular situation, the shift range switching mechanism 6 is inserted into the hydraulic controller 7 a predetermined amount more deeply than in the case of D Range; in the hydraulic controller 7, a hydraulic path for realizing N Range is established and hence the automatic transmission can be controlled so as to be N Range.

When in the foregoing situation in which the automatic transmission is set to N Range, the rotation axle 2 is further rotated clockwise (rightward) by a predetermined angle out of the bidirectional arrow D in FIG. 2, the rotation position of eh detent plate 3 changes in synchronization with the rotation of the rotation axle 2; therefore, the engagement portion 4*a* at the front end of the detent spring 4 escapes from the recess 3*c* for N Range and moves to the recess 3*b* for R Range provided at the left side of the recess 3*c*; then, the rotation position is maintained. In this particular situation, the shift range switching mechanism 6 is inserted into the hydraulic controller 7 a predetermined amount more deeply than in the case of N Range; in the hydraulic controller 7, a hydraulic path for realizing R Range is established and hence the automatic transmission can be controlled so as to be R Range.

When in the foregoing situation in which the automatic transmission is set to R Range, the rotation axle 2 is further rotated clockwise (rightward) by a predetermined angle out of the bidirectional arrow D in FIG. 2, the rotation position of eh detent plate 3 changes in synchronization with the rotation of the rotation axle 2; therefore, the engagement portion 4*a* at the front end of the detent spring 4 escapes from the recess 3*b* for R Range and moves to the recess 3*a* for P Range provided at the left side of the recess 3*b*; then, the rotation position is maintained. In this particular situation, the shift range switching mechanism 6 is inserted into the hydraulic controller 7 a predetermined amount more deeply than in the case of R Range; in the hydraulic controller 7, a hydraulic path for realizing P Range is established and hence the automatic transmission can be controlled so as to be P Range.

In such a way as described above, the shift range switching mechanism 6 is sequentially inserted into the inside of the hydraulic controller 7 through the detent plate 3; therefore, the hydraulic paths in the hydraulic controller 7 are switched from D to N, from N to R, and from R to P, in that order; as a result, the shift range of the automatic transmission can be controlled so as to change from D Range to N Range, from N Range to R Range, and from R Range to P Range, in that order.

In contrast, when the rotation axle 2 is rotated in a direction opposite to the foregoing direction, i.e., counterclockwise (leftward) by a predetermined angle out of the bidirectional arrow D in FIG. 2, the shift range switching mechanism 6 is pulled out from the inside of the hydraulic controller 7 through the detent plate 3; therefore, the hydraulic paths in the hydraulic controller 7 are switched from P to R, from R to N, and from N to D, in that order; as a result, the shift range of the automatic transmission can be controlled so as to change from P Range to R Range, from R Range to N Range, and from N Range to D Range, in that order.

As described above, the shift range switching mechanism 6 is driven by the rotation output of the actuator 1 so as to switch the shift ranges of the automatic transmission; the switching of the shift ranges (P, R, N, and D Ranges) of the automatic transmission is realized by shifting in a sliding manner the shift range switching mechanism 6 provided in the hydraulic controller 7 to the respective positions corresponding to the shift ranges so as to switch the hydraulic paths in the automatic transmission.

N Range and P Range are different from each other in the respective positions thereof at times when the shift range switching mechanism 6 is shifted in a sliding manner; however, both N Range and P Range form the non-travel hydraulic path. In this regard, however, in the case of P Range, in addition to the operation of the shift range switching mechanism 6, an after-mentioned parking switching mechanism (a generic name for a mechanism configured with reference numerals 8 through 13) is operated. The parking switching mechanism is to mechanically lock the output axle of the automatic transmission when the real shift range is set to P Range in conjunction with the shift range switching mechanism 6.

Switching between locking and unlocking of the output axle of the automatic transmission by the parking switching mechanism is implemented through engagement and unengagement between a recess 13*a* of a parking gear 13 and a protrusion 11*a* of a parking pole 11. The parking gear 13 is coupled with the output axle of the automatic transmission through an unillustrated drive shaft, an unillustrated differential gear, or the like; by restricting the rotation of the parking gear 13, the output axle and its periphery (a driving wheel and its periphery of the vehicle) of the automatic transmission is locked, so that locking of the parking switching mechanism is achieved.

A parking rod 8 for driving the parking pole 11 is mounted in the detent plate 3; a conical member 9 is provided at the front end of the parking rod 8. The conical member 9 intervenes between a protrusion 10 of the housing of the automatic transmission and parking pole 11; when the recess of the detent plate 3, which engages with the engagement portion 4*a* at the front end of the detent spring 4, moves from the recess 3*b* to the recess 3*a*, i.e., when the shift ranges are switched from R Range to P Range, the parking rod 8 shifts through the detent plate 3 in a direction indicated by the arrow A in FIG. 1 and hence the conical member 9 pushes and raises the parking pole 11. Then, the parking pole 11 rotates, in a direction indicated by the arrow B in FIG. 1, around a parking pole axle 12 that pivotably holds the parking pole 11; the protrusion 11*a* of the parking pole 11 and any one of the recesses 13*a* of the parking gear 13 engages with each other; then, locking of the parking switching mechanism is achieved.

Then, when the recess of the detent plate 3, which engages with the engagement portion 4*a* at the front end of the detent spring 4, moves from the recess 3*a* to the recess 3*b*, i.e., when the shift ranges are switched from P Range to R Range, the parking rod 8 is pulled back through the detent plate 3 in a direction opposite to the direction indicated by the arrow A in FIG. 1 and hence the conical member 9 loses the power for pushing and raising the parking pole 11. Then, because the parking pole 11 is always biased by an unillustrated spring in a direction opposite to the direction indicated by the arrow B in FIG. 1, the engagement between the protrusion 11*a* of the parking pole 11 and the recess 13*a* of the parking gear 13 is cancelled and hence the parking gear 13 is freed, so that the parking switching mechanism is unlocked.

Next, with reference to FIG. 1, the configuration and the function of an electronic control system in the shift range switching apparatus will be explained.

The constituent elements of the electronic control system in the shift range switching apparatus include the actuator 1, a detent position sensor 14, a real shift range determination means 15, a shift range setting means 16 a target shift range determination means 17, and an actuator control means 18.

The detent position sensor 14 is a detection means that outputs a signal corresponding to a real rotation angle position Rang of the detent plate 3; in general, a detection device utilizing Hall effect is employed. The real rotation angle position Rang of the detent plate 3, detected by the detent position sensor 14, is inputted to the real shift range determination means 15; based on the real rotation angle position Rang, the real shift range determination means 15 performs determination about which Range among P, R, N, and D Ranges a real shift range Rsft is, and outputs the determination result.

The shift range setting means 16 is an input device utilizing the foregoing "touch panel" or the like and outputs a demanded shift range when operated by a driver.

A demanded shift range outputted by the shift range setting means 16 is inputted to the target shift range determination means 17; the target shift range determination means 17 determines that the demanded shift range is a target shift range Tsft and outputs the target shift range Tsft. In addition, the target shift range determination means 17 calculates a target rotation angle position Tang, of the detent plate 3, that corresponds to the determined target shift range Tsft, and outputs the target rotation angle position Tang.

The real rotation angle position Rang of the detent plate 3 detected by the detent position sensor 14, the real shift range Rsft determined by the real shift range determination means 15, the target shift range Tsft determined by the target shift range determination means 17, and the target rotation angle position Tang are inputted to the actuator control means 18.

Then, based on the real rotation angle position Rang of the detent plate 3 and the target rotation angle position Tang, the actuator control means 18 starts driving of the actuator 1 so that the real shift range Rsft coincides with the target shift range Tsft; when the real shift range Rsft coincides with the target shift range Tsft, the actuator control means 18 stops the driving of the actuator 1.

As described above, the real shift range of the automatic transmission is switched over to the demanded shift range selected by the driver.

Next, the operation of switching the shift ranges at normal time will be explained with reference to the development view of the detent plate in FIG. 3.

Figure 3:
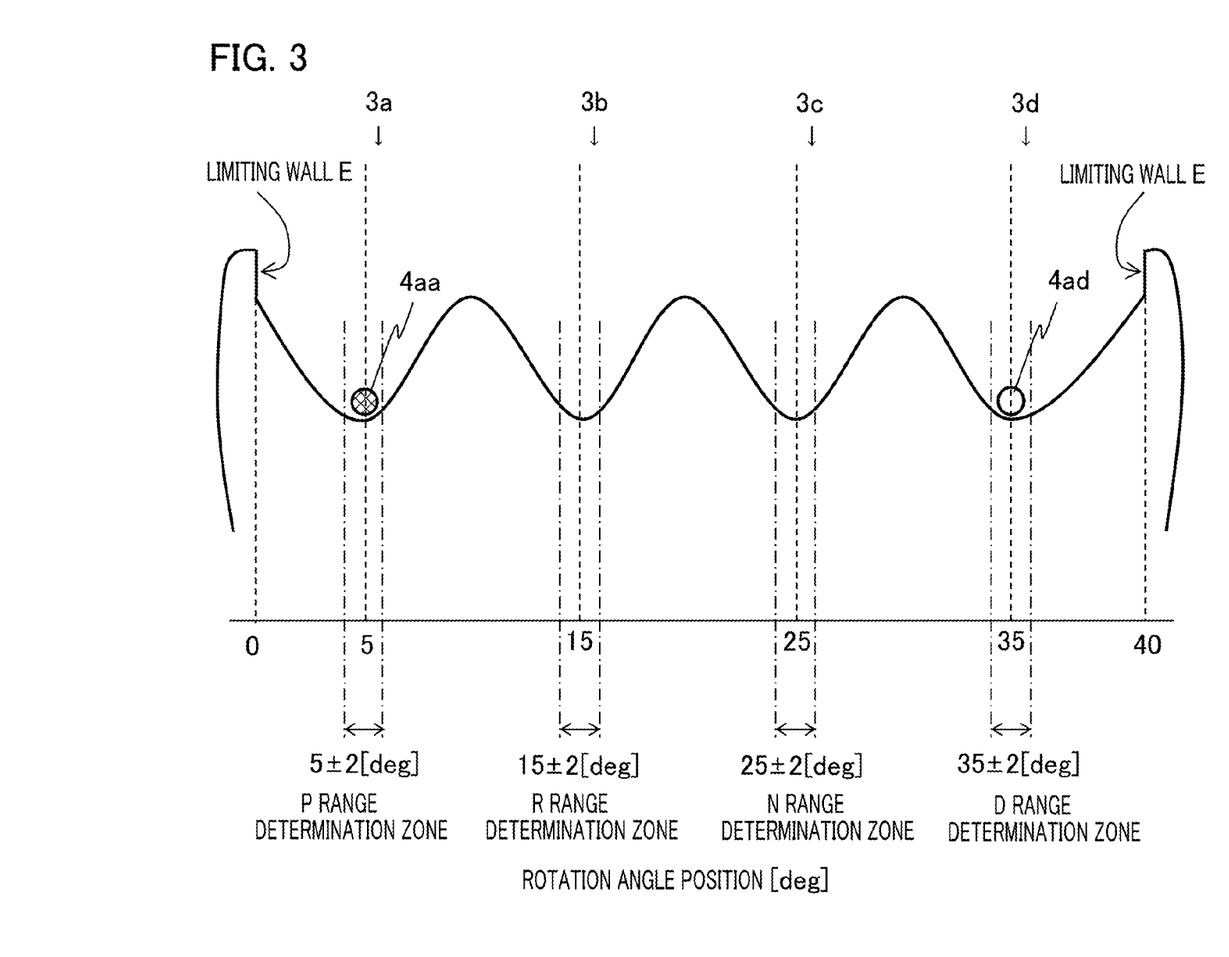
FIG. 3 is a development view of a detent plate in a shift range switching apparatus according to Embodiment 1 of the present invention.

FIG. 3 is a development view of the detent plate 3 for explaining the relationship among the real rotation angle position Rang of the detent plate 3 detected by the detent position sensor 14, the real shift range Rsft determined by the real shift range determination means 15, the target shift range Tsft determined by the target shift range determination means 17, and the target rotation angle position Tang (although as illustrated in FIG. 2, having the shape of an approximate sector with the rotation axle 2 as an axis, the accrual detent plate 3 is represented in a plan view with an abscissa of the rotation angle). For the sake of convenience, the cases where the engagement portion 4*a* of the detent spring 4 engages with the recesses 3*a* and 3*d* of the detent plate 3 are indicated by reference characters 4*aa* and 4*ad*, respectively.

The abscissa denotes the rotation angle position of the detent plate 3; the recesses 3*a*, 3*b*, 3*c*, and 3*d* for being engaged with the engagement portion 4*a* provided at the front end of the detent spring 4 are in the positional relationship the same as the positional relationship in each of FIGS. 1 and 2. Thus, when the engagement portion 4*a* is situated at the rotation angle position of 5 [deg], which suggests the recess 3*a* corresponding to P Range, the detent position sensor 14 detects that the real rotation angle position Rang is 5 [deg] and the real shift range determination means 15 determines that the real shift range Rsft is P Range.

In the determination of the real shift range, the decrepitude and variations of components are taken into consideration; for example, when being within ±2 [deg] from the real rotation angle position Rang of 5 [deg] corresponding to P Range, the real shift range of 5±2 [deg] is set, in the control, as a P Range determination zone, because even when the sliding shift amount of the shift range switching mechanism 6 is displaced from the shift amount corresponding to the real rotation angle position Rang of 5 [deg], designing is implemented in such a way that a hydraulic path for controlling the automatic transmission to be a desired shift range can be formed. As is the case with P Range determination zone, the ranges within 15±2 [deg], 25±2 [deg], and 35±2 [deg] are set as R Range determination zone, N Range determination zone, and D Range determination zone, respectively.

Respective travelable ranges of 5 [deg] (the angle positions 0 [deg] to 5 [deg] and 35 [deg] to 45 [deg]) exist at the outer sides of the recesses 3*a* and 3*d* at both ends of the detent plate 3; although due to overshooting of the positional control, the engagement portion 4*a* of the detent spring 4 may falls into each of these travelable ranges when the shift range is controlled so as to change from Ranges other than P Range to P Range or from Ranges other than D Range to D Range, the engagement portion 4*a* of the detent spring 4 never exceeds these travelable ranges to climb over the left and right limiting walls E.

In the case where the real rotation angle position Rang detected by the detent position sensor 14 is in the range from 3 [deg] to 7 [deg], the real shift range determination means 15 determines that the real shift range Rsft corresponds to P Range. When in this situation, the driver selects D Range by operating the shift range setting means 16, the shift range setting means 16 outputs D Range as the demanded shift range; then, the target shift range determination means 17 determines that the target shift range Tsft is D Range and the target rotation angle position Tang is 35 [deg]. As a result, the actuator control means 18 perceives that a difference between the real rotation angle position Rang of the detent plate 3 and the target rotation angle position Tang has occurred, and starts driving of the actuator 1 so that the real rotation angle position Rang coincides with the target rotation angle position Tang. As a result, the real rotation angle position Rang continues traveling without stopping in process of escaping from P Range determination zone and reaching D Range determination zone; when the real rotation angle position Rang falls into D Range determination zone, the actuator control means 18 determines that the real shift range Rsft has coincided with the target shift range Tsft, and then stops the driving of the actuator 1.

As described above, the real shift range of the automatic transmission is switched from P Range to D Range selected by the driver.

Next, with reference to the development vie of the detent plate in FIG. 4, there will be explained problems posed at a time when during driving of the electric motor, i.e., in process of changing the real shift range, the power source for the shift range switching apparatus is instantaneously interrupted and then the shift range switching apparatus is activated again. In the shift range switching apparatus illustrated in the overall configuration diagram in FIG. 1, immediately after the power source is instantaneously interrupted and the shift range switching apparatus is activated again, the microcomputer that presides over the electronic system is reset; therefore, driving of the electric motor is stopped, and various information items such as the real rotation angle position Rang and the target shift range Tsft, which have been stored in RAM (Read Only Memory) or the like, are initialized and hence data is lost.

However, the real rotation angle position Rang is newly detected by the detent position sensor 14 immediately after the reactivation; therefore, the present values of the real rotation angle position Rang and the real shift range Rsft to be determined by the real shift range determination means 15 are immediately obtained.

With regard to the target shift range Tsft and the target rotation angle position Tang, however, it becomes unknown for which target shift range Tsft the actuator 1 has been driven before the power source is instantaneously interrupted; therefore, the real shift range Rsft becomes indeterminate and hence normal control cannot be continued, or in some cases, the shift range may be switched over to the one that is different from the demanded shift range selected by the driver.

Accordingly, in the present invention, based on the real rotation angle position Rang detected by the detent position sensor 14 immediately after the power source is instantaneously interrupted and the shift range switching apparatus is activated again, the target shift range Tsft that has been set before the interruption of the power source is estimated, and then by use of the estimated target shift range Tsft, the real rotation angle position Rang is controlled.

Hereinafter, by use of the development view of the detent plate 3 represented in FIG. 4, there will be explained how and why it is made possible that based on the real rotation angle position Rang detected by the detent position sensor 14 immediately after the power source is instantaneously interrupted and the shift range switching apparatus is activated again, the target shift range Tsft that has been set before the interruption of the power source is estimated.

Figure 4:
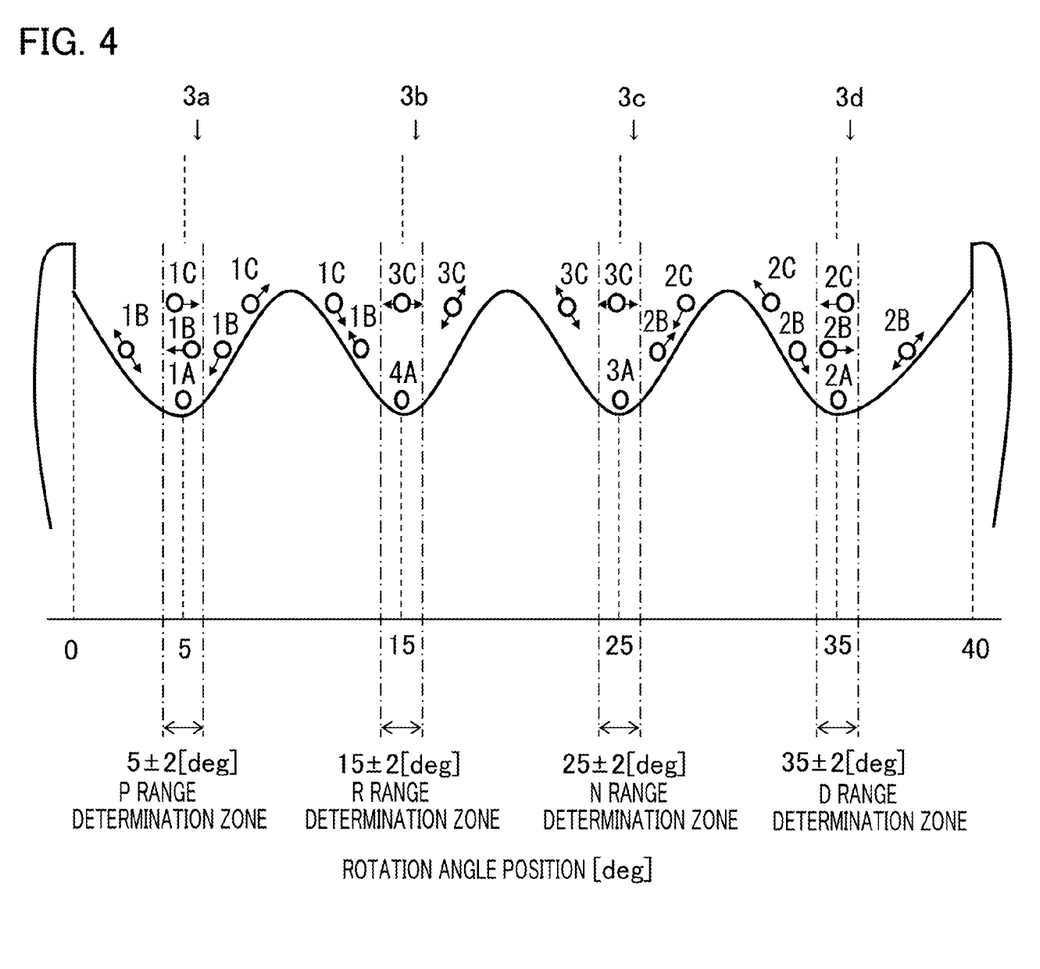
FIG. 4 is a development view of a detent plate in a shift range switching apparatus according to Embodiment 1 of the present invention.

A plurality of "○" signs utilized in FIG. 4 denote the positions of the engagement portion 4a provided at the front end of the detent spring 4; in other words, each of the positions of these "○" signs is the real rotation angle position Rang detected by the detent position sensor 14. Each of the "○" signs accompanied by an arrow indicates the shifting direction in which when the target shift ranges Tsft are switched and hence the actuator 1 is driven, the real rotation angle position Rang changes toward the target rotation angle position Tang. Each of the "○" signs unaccompanied by any arrow indicates the state in which because the target shift ranges Tsft are not switched, the actuator 1 is stopped and hence the real rotation angle position Rang coincides with the target rotation angle position Tang and in a standstill condition.

At first, "○" sign 1A in FIG. 4 denote the state in which both the target shift range Tsft and the real shift range Rsft are P Range, the actuator 1 is stopped, and the real rotation angle position Rang is at a standstill within the P Range determination zone. Accordingly, in this case, based on the rotation angle position Rang, it can be estimated that the target shift range Tsft is P Range; however, in order to determine that the real rotation angle position Rang is at a standstill within the P Range determination zone, it is required to determine that the rotation angle position Rand is continuously at a standstill within the P Range determination zone for a predetermined time.

In contrast, "○" sign 1B in FIG. 4 denote the state in which the target shift range Tsft is P Range and the real shift range Rsft is one of Ranges other than P Range, the actuator 1 is driven, and the real rotation angle position Rang is traveling from one of Ranges other than P Range to P Range. Accordingly, even in this case, it can be estimated that the target shift range Tsft is P Range, based on the rotation angle position Rang.

"○" sign 1C in FIG. 4 denote the state in which when the real shift range Rsft is P Range, the target shift range Tsft is switched over to one of Ranges other than P Range, the actuator 1 is driven, and the real rotation angle position Rang is traveling from P Range to one of Ranges other than P Range. In this case, only from the real rotation angle position Rang, it cannot be estimated to which Range among R, N, and D Ranges the target shift range Tsft is switched over; however, at least, it can be estimated that the target shift range Tsft (=real shift range Rsft) before the switching has been P Range.

As described above, in the case where the real rotation angle position Rang detected by the detent position sensor 14 immediately after the reactivation following instantaneous power interruption is indicated by the "○" sign 1B in FIG. 4, even when due to the reactivation, information on the target shift range Tsft is lost, it can be estimated that the target shift range Tsft is P Range, based on the rotation angle position Rang; therefore, the target shift range is determined to be P Range and the control is continued. Because the range of the "○" sign 1B includes the range of the "○" sign 1A, there is not required the determination, described in the explanation for the state indicated by the "○" sign 1A, that the rotation angle position Rang is continuously at a standstill within the P Range determination zone for a predetermined time.

In the case where the real rotation angle position Rang detected by the detent position sensor 14 immediately after the reactivation following instantaneous power interruption is indicated by the "○" sign 1C in FIG. 4, it is difficult to estimate the target shift range Tsft after the reactivation; therefore, P Range, which is estimated to have been the target shift range Tsft (=real shift range Rsft) at the timing immediately before the reactivation, is determined as the target shift range Tsft and then the control is continued.

The range of the angle position for, as described above, determining P Range as the target shift range Tsft, based on the real rotation angle position Rang at the timing immediately after the reactivation, will be referred to as a first range.

Next, "○" sign 2A in FIG. 4 denote the state in which both the target shift range Tsft and the real shift range Rsft are D Range, the actuator 1 is stopped, and the real rotation angle position Rang is at a standstill within the D Range determination zone. Accordingly, in this case, based on the rotation angle position Rang, it can be estimated that the target shift range Tsft is D Range; however, in order to determine that the real rotation angle position Rang is at a standstill within the D Range determination zone, it is required to determine that the rotation angle position Rand is continuously at a standstill within the D Range determination zone for a predetermined time.

"○" sign 2B in FIG. 4 denote the state in which the target shift range Tsft is D Range and the real shift range Rsft is one of Ranges other than D Range, the actuator 1 is driven, and the real rotation angle position Rang is traveling from one of Ranges other than D Range to D Range. Accordingly, even in this case, it can be estimated that the target shift range Tsft is D Range, based on the rotation angle position Rang.

"○" sign 2C in FIG. 4 denote the state in which when the real shift range Rsft is D Range, the target shift range Tsft is switched over to one of Ranges other than D Range, the actuator 1 is driven, and the real rotation angle position Rang is traveling from D Range to one of Ranges other than D Range. In this case, only from the real rotation angle position Rang, it cannot be estimated to which Range among P, R, N Ranges the target shift range Tsft is switched over; however, at least, it can be estimated that the target shift range Tsft (=real shift range Rsft) before the switching has been D Range.

As described above, in the case where the real rotation angle position Rang detected by the detent position sensor 14 immediately after the reactivation following instantaneous power interruption is indicated by the "○" sign 2A or 2B in FIG. 4, even when due to the reactivation, information on the target shift range Tsft is lost, it can be estimated that the target shift range Tsft is D Range, based on the rotation angle position Rang; therefore, the target shift range is determined to be D Range and the control is continued. Because the range of the "○" sign 2B includes the range of the "○" sign 2A, there is not required the determination, described in the explanation for the state indicated by the "○" sign 2A, that the rotation angle position Rang is continuously at a standstill within the D Range determination zone for a predetermined time.

In the case where the real rotation angle position Rang detected by the detent position sensor 14 immediately after the reactivation following instantaneous power interruption is indicated by the "○" sign 2C in FIG. 4, it is difficult to estimate the target shift range Tsft after the reactivation; therefore, D Range, which is estimated to have been the target shift range Tsft (=real shift range Rsft) at the timing immediately before the reactivation, is determined as the target shift range Tsft and then the control is continued.

The range of the angle position for, as described above, determining D Range as the target shift range Tsft, based on the real rotation angle position Rang at the timing immediately after the reactivation, will be referred to as a second range.

Next, "○" sign 3A in FIG. 4 denote the state in which both the target shift range Tsft and the real shift range Rsft are N Range, the actuator 1 is stopped, and the real rotation angle position Rang is at a standstill within the N Range determination zone. Accordingly, in this case, based on the rotation angle position Rang, it can be estimated that the target shift range Tsft is N Range; however, in order to determine that the real rotation angle position Rang is at a standstill within the N Range determination zone, it is required to determine that the rotation angle position Rand is continuously at a standstill within the N Range determination zone for a predetermined time; however, because the range of after-mentioned "○" sign 3C includes the range of the "○" sign 3A, there is not required the determination, described in the explanation for the state indicated by the "○" sign 3A, that the rotation angle position Rang is continuously at a standstill within the N Range determination zone for a predetermined time.

Next, the state indicated by the "○" sign 3C in FIG. 4 denotes either the state in which when the real shift range Rsft is P Range or R Range, the target shift range Tsft is switched over to N Range or D Range, the actuator 1 is driven, and the rotation angle position Rang is traveling from P Range or R Range to N Range or D Range or the state in which when the real shift range Rsft is N Range or D Range, the target shift range Tsft is switched over to P Range or R Range, the actuator 1 is driven, and the rotation angle position Rang is traveling from N Range or N Range to P Range or R Range.

In this case, only from the real rotation angle position Rang, it cannot be estimated to which Range among P, R, N Ranges the target shift range Tsft is switched over; therefore, in this case, N Range is determined as the target shift range and then the control of switching the shift ranges is continued. The range of the angle position for, as described above, determining N Range as the target shift range Tsft, based on the real rotation angle position Rang at the timing immediately after the reactivation, will be referred to as a third range.

Next, "○" sign 4A in FIG. 4 denote the state in which both the target shift range Tsft and the real shift range Rsft are R Range, the actuator 1 is stopped, and the real rotation angle position Rang is at a standstill within the R Range determination zone. Accordingly, in this case, based on the rotation angle position Rang, it can be estimated that the target shift range Tsft is N Range; however, in order to determine that the real rotation angle position Rang is at a standstill within the R Range determination zone, it is required to determine that the rotation angle position Rand is continuously at a standstill within the R Range determination zone for a predetermined time.

In contrast, the range of the "○" sign 3C includes the range of the "○" sign 4A; thus, when priority is given to the operation in the "○" sign 3C, the target shift range Tsft is changed to N Range after reactivation, even when both the target shift range Tsft and the real shift range Rsft have been R Range; therefore, in order to respond to the demanded shift range selected by the driver, it is determined whether or not the real rotation angle position Rang detected by the detent position sensor 14 immediately after the reactivation is at a standstill within the R Range determination zone, when the real rotation angle position Rang is within the R Range determination zone; in the case where it is determined that the real rotation angle position Rang is at a standstill within the R Range determination zone, the target shift range Tsft is determined to be R Range and the control is continued.

As described above, in the shift range switching apparatus according to Embodiment 1, when due to instantaneous interruption of the power source supplied to the shift range switching apparatus, the shift range switching apparatus is reactivated, the target shift range is determined in accordance with the rotation position of the detent plate detected by the detent position sensor immediately after the reactivation; then, the control of switching the shift ranges is continued.

In the shift range switching apparatus, when due to instantaneous interruption of the power source supplied to the shift range switching apparatus, the shift range switching apparatus is reactivated and the rotation position of the detent plate detected by the detent position sensor immediately after the reactivation is within the first range, set closer to P Range than to the predetermined rotation position range for R-Range determination, the target shift range is determined to be P Range and the control of switching the shift ranges is continued.

In other words, in the case where it is anticipated that the control state at the timing immediately before instantaneous power interruption is any one of the following states 1A), 1B), and 1C), the target shift range is determined to be P Range and then the control of switching the shift ranges is continued.

1A): Both the target shift range and the real shift range are P Range.

1B): The target shift range is P Range and the real shift range is being controlled so as to change from one of Ranges other than P Range to P Range.

1C): The target shift range is one of Ranges other than P Range (however, it is unknown which Range among R, N, and D Ranges the true target shift range is) and the real shift range is being controlled so as to change from P Range to one of Ranges other than P Range.

In the shift range switching apparatus, when due to instantaneous interruption of the power source supplied to the shift range switching apparatus, the shift range switching apparatus is reactivated and the rotation position of the detent plate detected by the detent position sensor immediately after the reactivation is within the second range, set closer to D Range than to the predetermined rotation position range for N-Range determination, the target shift range is determined to be D Range and the control of switching the shift ranges is continued.

In other words, in the case where it is anticipated that the control state at the timing immediately before instantaneous power interruption is any one of the following states 2A), 2B), and 2C), the target shift range is determined to be D Range and then the control of switching the shift ranges is continued.

2A): Both the target shift range and the real shift range are D Range.

2B): The target shift range is D Range and the real shift range is being controlled so as to change from one of Ranges other than D Range to D Range.

2C): The target shift range is one of Ranges other than D Range (however, it is unknown which Range among N, R, and P Ranges the true target shift range is) and the real shift range is being controlled so as to change from D Range to one of Ranges other than D Range.

In the shift range switching apparatus, when due to instantaneous interruption of the power source supplied to the shift range switching apparatus, the shift range switching apparatus is reactivated and the rotation position of the detent plate detected by the detent position sensor immediately after the reactivation is within the third range, set between the predetermined rotation position range for R-Range determination and the predetermined rotation position range for N-Range determination, the target shift range is determined to be N Range and the control of switching the shift ranges is continued.

In other words, in the case where the control state at the timing immediately before instantaneous power interruption cannot be anticipated and the present situation is the following state 3A), the target shift range is determined to be N Range and then the control of switching the shift ranges is continued.

3A): The target shift range is uncertain (the target shift range cannot be specified).

In the shift range switching apparatus, when due to instantaneous interruption of the power source supplied to the shift range switching apparatus, the shift range switching apparatus is reactivated, the target shift range is determined to be P Range when the rotation position of the detent plate detected by the detent position sensor immediately after the reactivation is within the first range; the target shift range is determined to be D Range when the rotation position of the detent plate detected by the detent position sensor immediately after the reactivation is within the second range; the target shift range is determined to be N Range when the rotation position of the detent plate detected by the detent position sensor immediately after the reactivation is within the third range; then, the control of switching the shift ranges is continued.

That is to say, in the case where it is anticipated that the control state at the timing immediately before instantaneous power interruption is any one of the following states 1A), 1B), and 1C), the target shift range is determined to be P Range and then the control of switching the shift ranges is continued; in the case where it is anticipated that the control state at the timing immediately before instantaneous power interruption is any one of the following states 2A), 2B), and 2C), the target shift range is determined to be D Range and then the control of switching the shift ranges is continued; in the case where it is anticipated that the control state at the timing immediately before instantaneous power interruption is 3C), the target shift range is determined to be N Range; then, the control of switching the shift ranges is continued.

In the shift range switching apparatus, when due to instantaneous interruption of the power source supplied to the shift range switching apparatus, the shift range switching apparatus is reactivated and the rotation position of the detent plate detected by the detent position sensor immediately after the reactivation is, continuously for a predetermined time, within the predetermined rotation position range, preliminarily set for R-Range (retreat travel range) determination, the target shift range is determined to be R Range in preference to N Range; then, the control of switching the shift ranges is continued.

In other words, in the case where it is anticipated that the control state at the timing immediately before instantaneous power interruption is the following state 4A), the target shift range is determined to be R Range and then the control of switching the shift ranges is continued.

4A): Both the target shift range and the real shift range are R Range.

In the shift range switching apparatus according to Embodiment 1, when due to instantaneous interruption of the power source supplied to the shift range switching apparatus, the shift range switching apparatus is reactivated, the target shift range is determined in accordance with the rotation position of the detent plate detected by the detent position sensor immediately after the reactivation; then, the control of switching the shift ranges is continued. As a result, a fail-safe mechanism that is appropriate when the shift range switching apparatus is reactivated can be provided.

In the shift range switching apparatus according to Embodiment 1, even when the fact that the target shift range at the timing immediately before instantaneous power interruption has been P Range is lost, the target shift range at the timing after the reactivation is set to P Range; therefore, a fail-safe mechanism that is appropriate when the shift range switching apparatus is reactivated can be provided. In the case where it cannot be specified which Range other than P Range the target shift range at the timing immediately before the instantaneous power interruption has been, the target shift range at the timing immediately after the reactivation is set to P Range, which is anticipated as the real shift range at the timing immediately before the instantaneous power interruption; thus, there occurs only cancellation of the demanded shift range selected by the driver immediately before the reactivation, and hence, at least, the shift range is prevented from being erroneously controlled so as to be one of the shift ranges, which is not anticipated by the driver; therefore, a fail-safe mechanism that is appropriate when the shift range switching apparatus is reactivated can be provided.

In the shift range switching apparatus according to Embodiment 1, even when the fact that the target shift range at the timing immediately before instantaneous power interruption has been D Range is lost, the target shift range at the timing after the reactivation is set to D Range; therefore, a fail-safe mechanism that is appropriate when the shift range switching apparatus is reactivated can be provided. In the case where it cannot be specified which Range other than D Range the target shift range at the timing immediately before the instantaneous power interruption has been, the target shift range at the timing immediately after the reactivation is set to D Range, which is anticipated as the real shift range at the timing immediately before the instantaneous power interruption; thus, there occurs only cancellation of the demanded shift range selected by the driver immediately before the reactivation, and hence, at least, the shift range is prevented from being erroneously controlled so as to be one of the shift ranges, which is not anticipated by the driver; therefore, a fail-safe mechanism that is appropriate when the shift range switching apparatus is reactivated can be provided.

In the shift range switching apparatus according to Embodiment 1, when it is uncertain that which Range the target shift range at the timing immediately before instantaneous power interruption has been, the target shift range at the timing after the reactivation is set to N Range; therefore, the shift range is prevented from being erroneously controlled so as to be any one of P, R, and D Ranges. As a result, a fail-safe mechanism that is appropriate when the shift range switching apparatus is reactivated can be provided.

In the shift range switching apparatus according to Embodiment 1, even when due to reactivation, the fact that the real shift range at the timing immediately before instantaneous power interruption has been R Range is lost, the target shift range at the timing after the reactivation is set to R Range; therefore, a fail-safe mechanism that is appropriate when the shift range switching apparatus is reactivated can be provided.

In the shift range switching apparatus according to Embodiment 1, it is not required to utilize a nonvolatile storage device for realize the effects of the foregoing inventions; therefore, the shift range switching apparatus can be provided at low cost.

Figure 5A:
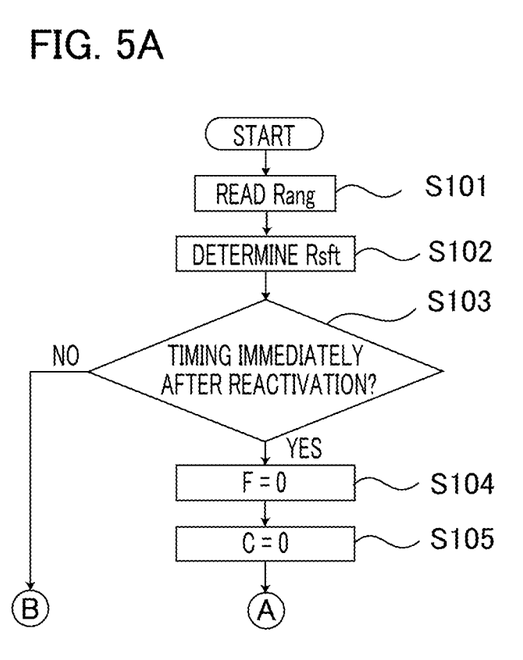
FIG. 5A is a flowchart for explaining the control method of a shift range switching apparatus according to Embodiment 1 of the present invention.
Figure 5B:
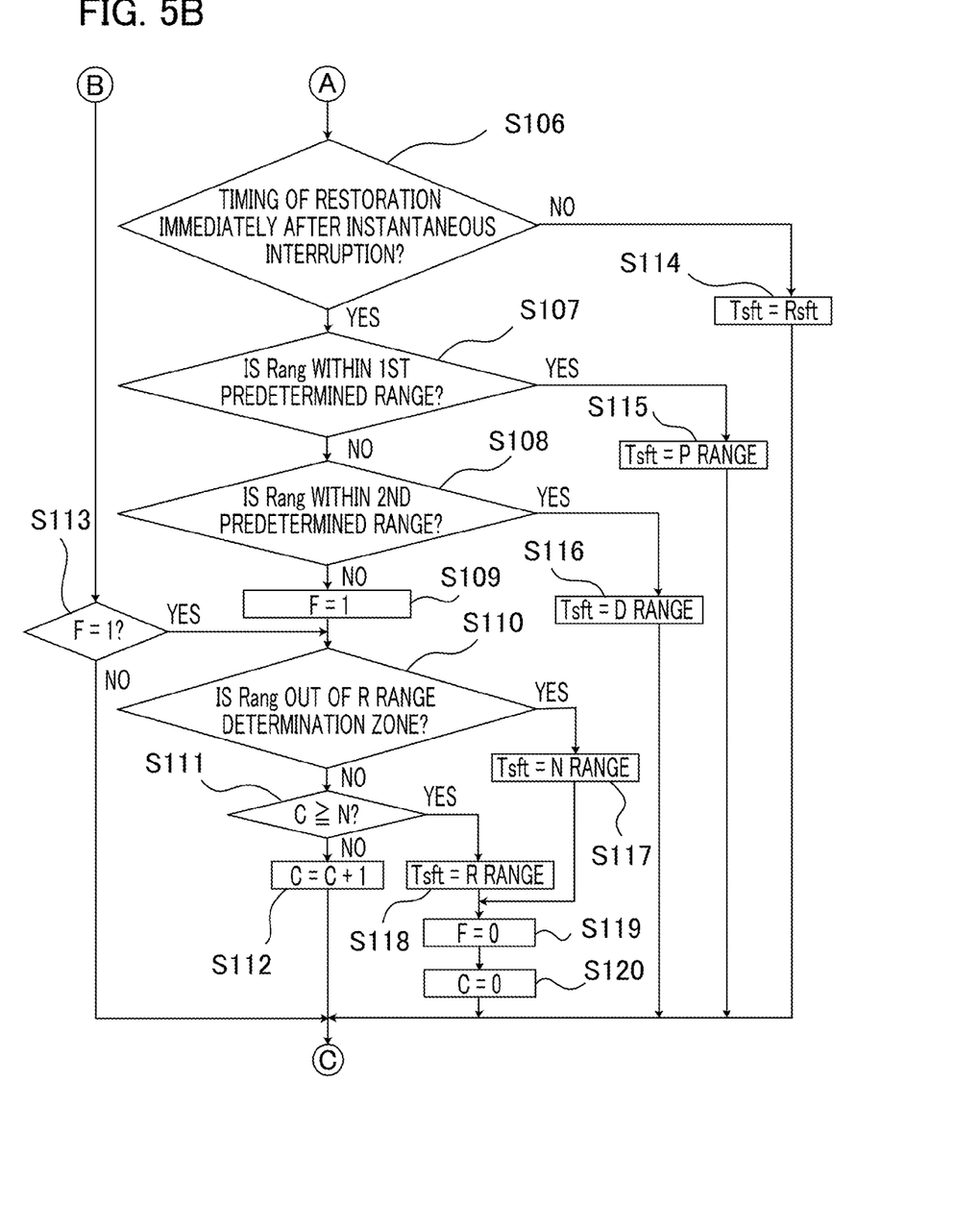
FIG. 5B is a flowchart for explaining the control method of a shift range switching apparatus according to Embodiment 1 of the present invention.
Figure 5C:
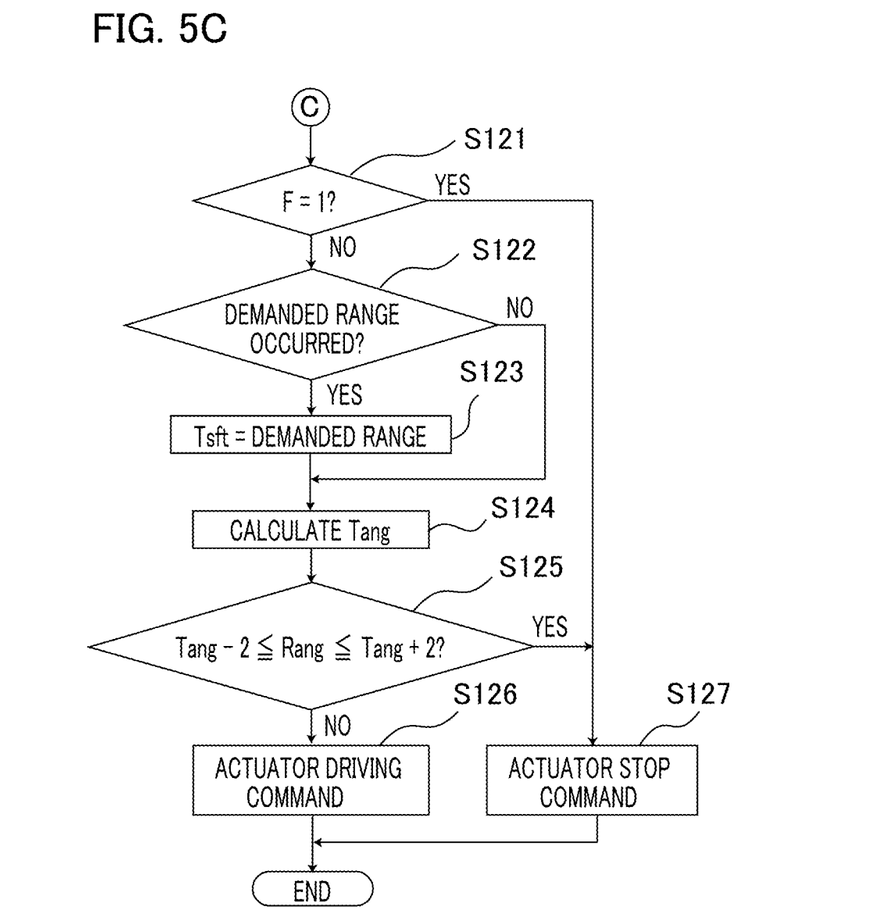
FIG. 5C is a flowchart for explaining the control method of a shift range switching apparatus according to Embodiment 1 of the present invention.

Subsequently, with reference to a flowchart in FIG. 5A, FIG. 5B and FIG. 5C, the method of controlling the foregoing shift range switching apparatus according to the present invention will be explained.

In the step S101, the real rotation angle position Rang of the detent plate 3 detected by the detent position sensor 14 is read, and in the step S102, the real shift range Rsft is determined based on the real rotation angle position Rang.

In the step S103, it is determined whether or not the present timing is immediately after the shift range switching apparatus has been reactivated; in the case where the present timing is not immediately after the shift range switching apparatus has been reactivated (in the case of NO), the step S103 is followed by the step S113; in the case where the present timing is immediately after the shift range switching apparatus has been reactivated, the step S103 is followed by the step S104.

In the case where the present timing is immediately after the shift range switching apparatus has been reactivated, a flag F and a counter value C utilized in this control are cleared to "0" in the steps S104 and S105, respectively; then, the step S105 is followed by the step S106.

In the step S106, it is determined whether the present reactivation has been a normal reactivation by turning on the key switch or an abnormal reactivation due to instantaneous power interruption.

In the case where it is determined that the present reactivation has been a normal reactivation by turning on the key switch (in the case of NO), the step S106 is followed by the step S114, where the target shift range Tsft is determined to be the real shift range Rsft, for example, determined in the step S102; then, the step S114 is followed by the step S121.

In the step S121, the state of the flag F is determined; however, because the flag F has been cleared (F=0) in the step S104, the result of the present determination becomes "NO"; then, the step S121 is followed by the step S122.

In the step S122, it is determined whether or not a demanded shift range has occurred due to the operation by the driver; in the case where a demanded shift range has occurred (in the case of YES), the step S122 is followed by the step S123, where the target shift range is determined to be the demanded shift range; then, the step S123 is followed by the step S124. In contrast, in the case where no demanded shift range has occurred (in the case of NO), the step S122 is directly followed by the step S124.

Then, in the step S124, based on the present determined target shift range Tsft, the target rotation angle position Tang corresponding to the target shift range Tsft is calculated, and then, the step S124 is followed by the step S125.

In the step S125, it is determined whether or not the real rotation angle position Rang read in the step S101 coincides with the target rotation angle position Tang calculated in the step S124. In Embodiment 1, the range determination zone is set to, for example, a range within ±2 [deg] of the target rotation angle position Tang (Tang−2≤Rang≤Tang+2).

In the step S125, in the case where the real rotation angle position Rang is not within the determination zone of the target shift range Tsft (in the case of NO), the step S125 is followed by the step S126, where driving of the actuator 1 is commanded; then, the processing is ended. In contrast, in the case where the real rotation angle position Rang is within the determination zone of the target shift range Tsft (in the case of YES), the step S125 is followed by the step S127, where stopping of the actuator 1 is commanded; then, the processing is ended.

When the next timing of implementing the processing comes, the processing is started again from the step S101. As is the case with the foregoing processing, again, in the step S101, the real rotation angle position Rang detected by the detent position sensor 14 is read, and in the step S102, the real shift range Rsft is determined based on the real rotation angle position Rang.

In the step S103, it is determined whether or not the present timing is immediately after the shift range switching apparatus has been reactivated; because this time, the present timing is not immediately after the shift range switching apparatus has been reactivated, the result of the determination becomes "NO"; thus, the step S103 is followed by the step S113.

In the step S113, the state of the flag F is determined; however, because the flag F is kept cleared (F=0), the result of the present determination becomes "NO"; thus, the step S113 is followed by the step S121.

Because processing items in the steps S121 through S127 are the same as the processing items, described above, explanations therefor will be omitted; however, in summary, in the steps S121 through S127, there is performed operation in which when due to operation by the driver, a demanded shift range has occurred, the target shift range is updated by the demanded shift range, the target rotation angle position Tang is calculated, and a command of driving the actuator 1 is maintained until the real rotation angle position Rang reaches the determination zone of the target shift range Tsft.

Next, there will be explained processing to be performed when the present timing is immediately after an abnormal reactivation caused by instantaneous power interruption.

At first, as is the case with the foregoing description, in the step S101, the real rotation angle position Rang of the detent plate 3 detected by the detent position sensor 14 is read, and in the step S102, the real shift range Rsft is determined based on the real rotation angle position Rang.

In the step S103, it is determined whether or not the present timing is immediately after the shift range switching apparatus has been reactivated; in the case where the present timing is immediately after an abnormal reactivation caused by instantaneous power interruption, the result of the determination becomes "YES", and the step S103 is followed by the step S104 and the step S105, where the flag F and the counter value C utilized in this control are cleared to "0", respectively; then, the step S105 is followed by the step S106.

In the case where it is determined that the present reactivation is an abnormal reactivation caused by instantaneous power interruption (in the case of YES), the step S106 is followed by the step S107.

In the step S107, it is determined whether or not the real rotation angle position Rang read in the step S101 is within a first range (a range with which the target shift range Tsft at the timing immediately after reactivation caused by instantaneous power interruption is determined to be P Range); in the case where the real rotation angle position Rang is within the first range (in the case of YES), the step S107 is followed by the step S115, where the target shift range Tsft is determined to be P Range; then, the step S115 is followed by the step S121.

In the step S108, it is determined whether or not the real rotation angle position Rang read in the step S101 is within a second range (a range with which the target shift range Tsft at the timing immediately after reactivation caused by instantaneous power interruption is determined to be D Range); in the case where the real rotation angle position Rang is within the second range (in the case of YES), the step S108 is followed by the step S116, where the target shift range Tsft is determined to be D Range; then, the step S116 is followed by the step S121.

In the case where the real rotation angle position Rang read in the step S101 is neither within the first range nor within the second range, the step S108 is followed by the step S109.

In the step S109, the flag F is set to "1" for the first time, and then the step S109 is followed by the step S110, where it is determined whether or not the real rotation angle position Rang read in the step S101 is out of the R Range determination zone; in the case where the result of the determination becomes "YES", i.e., in the case where it is determined that the real rotation angle position Rang read in the step S101 is within a third range (a range with which the target shift range Tsft at the timing immediately after reactivation caused by instantaneous power interruption is determined to be N Range), the step S110 is followed by the step S117, where the target shift range Tsft is determined to be N Range; then, in the steps S119 and S120, the flag F and the counter value C, respectively, utilized in this control are cleared to "0", and then the step S120 is followed by the step S121.

In the step S121, the state of the flag F is determined; because even when the target shift range Tsft is determined to be either P Range (in the step S114) or D Range (in the step S115), the flag F has not been operated, the result of the determination in the step S121 becomes "NO"; then, the step S121 is followed by the step S122. Because even when the target shift range Tsft is determined to be N Range (in the step S117), the flag F has been cleared to "0" in the processing of the step S119, the result of the determination in the step S121 becomes "NO"; then, the step S121 is followed by the step S122.

Then, in the step S122, it is determined whether or not a demanded shift range has occurred due to the operation by the driver; in the case where a demanded shift range has occurred (in the case of YES), the step S122 is followed by the step S123, where the target shift range is determined to be the demanded shift range; then, the step S123 is followed by the step S124. In contrast, in the case where no demanded shift range has occurred (in the case of NO), the step S122 is directly followed by the step S124. Then, in the step S124, based on the present determined target shift range Tsft, the target rotation angle position Tang corresponding to the target shift range Tsft is calculated, and then, the step S124 is followed by the step S125.

In the step S125, it is determined whether or not the real rotation angle position Rang read in the step S101 coincides with the target rotation angle position Tang calculated in the step S124; in the case where the real rotation angle position Rang is not within the determination zone of the target shift range Tsft (in the case of NO), the step S125 is followed by the step S126, where driving of the actuator 1 is commanded; then, the processing is ended. In contrast, in the case where the real rotation angle position Rang is within the determination zone of the target shift range Tsft (in the case of YES), the step S125 is followed by the step S127, where stopping of the actuator 1 is commanded; then, the processing is ended.

When the next timing of implementing the processing comes, the processing is started again from the step S101. As is the case with the foregoing processing, again, in the step S101, the real rotation angle position Rang detected by the detent position sensor 14 is read, and in the step S102, the real shift range Rsft is determined based on the real rotation angle position Rang.

In the step S103, it is determined whether or not the present timing is immediately after the shift range switching apparatus has been reactivated; because this time, the present timing is not immediately after the shift range switching apparatus has been reactivated, the result of the determination becomes "NO"; thus, the step S103 is followed by the step S113. In the step S113, the state of the flag F is determined; however, because the flag F is kept cleared (F=0), the result of the present determination becomes "NO"; thus, the step S113 is followed by the step S121.

Because processing items in the steps S121 through S127 are the same as the processing items, described above, explanations therefor will be omitted; however, in summary, in the steps S121 through S127, there is performed operation in which when due to operation by the driver, a demanded shift range has occurred, the target shift range is updated by the demanded shift range, the target rotation angle position Tang is calculated, and a command of driving the actuator 1 is maintained until the real rotation angle position Rang reaches the determination zone of the target shift range Tsft.

Next, there will be explained the case where the real rotation angle position Rang read in the step S101 at the timing immediately after an abnormal reactivation caused by instantaneous power interruption is within the R Range determination zone.

In the case where in the step S110, the real rotation angle position Rang read in the step S101 is within the R Range determination zone (in the case of "NO" determination), the step S110 is followed by the step S111.

In the step S111, it is determined whether or not the value C of a counter utilized for ascertaining that a predetermined time has elapsed is larger than "N". Assuming that N is "2", it is determined in the step S111 whether or not the counter value C is the same as or larger than "2". Because the counter value C has never been incremented and hence is kept "0", the result of the determination in the step S111 becomes "NO"; thus, the step S111 is followed by the step S112, where the counter value C is incremented by "1", and then the step S112 is followed by the step S121.

In the step S121, the state of the flag F is determined; because in the present case where the step S110 is followed by the step S111, the flag F has been set to "1" in the step S109 and is kept as it is, the step S121 is followed by the step S127, where stopping of the actuator 1 is commanded, and then the processing is ended.

When the next timing of implementing the processing comes, the processing is started again from the step S101. As is the case with the foregoing processing, again, in the step S101, the real rotation angle position Rang detected by the detent position sensor 14 is read, and in the step S102, the real shift range Rsft is determined based on the real rotation angle position Rang.

In the step S103, it is determined whether or not the present timing is immediately after the shift range switching apparatus has been reactivated; because this time, the present timing is not immediately after the shift range switching apparatus has been reactivated, the result of the determination becomes "NO"; thus, the step S103 is followed by the step S113.

Then, in the step S113, the state of the flag F is determined.

Because in the present case, the flag F has been set to "1", the result of the determination becomes "YES"; thus, the step S113 is followed by the step S110, where it is determined again whether or not the real rotation angle position Rang read in the step S101 is out of the R Range determination zone.

In the case where it is determined in the step S110 that the real rotation angle position Rang is out of the R Range determination zone, it is determined that the real rotation angle position Rang has not been continuously at a standstill within the R Range determination zone for a predetermined time; thus, the step S110 is followed by the step S117. In the case where the step S110 is followed by the step S117, there is performed the processing in which, as described above, the target shift range is determined to be N Range.

In contrast, in the case where it is determined in the step S110 that the real rotation angle position Rang is not out of the R Range determination zone, it is determined that the real rotation angle position Rang is still at a standstill within the R Range determination zone; thus, the step S110 is followed by the step S111.

In the step S111, it is determined again whether or not the counter value C is the same as or larger than "N". Because the counter value C has been incremented only once and hence is "0", the result of the determination in the step S111 again becomes "NO"; thus, the step S111 is followed by the step S112, where the counter value C is further incremented by "1", and then the step S112 is followed by the step S121.

In the step S121, the state of the flag F is determined; because the flag F has been set to "1" and is kept as it is, the step S121 is followed by the step S127, where stopping of the actuator 1 is commanded, and then the processing is ended.

Then, when the next timing of implementing the processing comes, processing items in the steps S101, S102, S103, S112, and S110 are implemented in that order; in the case where it is determined that the real rotation angle position Rang is out of the R Range determination zone, the step S110 is followed by the step S117, where there is implemented the processing in which the target shift range Tsft is determined to be N Range.

In contrast, in the case where it is determined in the step S110 that the real rotation angle position Rang is not out of the R Range determination zone, it is determined that the real rotation angle position Rang is still at a standstill within the R Range determination zone; thus, the step S110 is followed by the step S111.

In the step S111, it is determined again whether or not the counter value C is the same as or larger than "N". Because the counter value C has been incremented twice and hence is "2", the result of the determination in the step S111 becomes "YES"; thus, the step S111 is followed by the step S118, where the target shift range Tsft is determined to be R Range; then, in the steps S119 and S120, the flag F and the counter value C, respectively, are cleared to "0", and then the step S120 is followed by the step S121.

Then, in and after the step S121, the processing items the same as those described above are implemented, as the flag F is "0".

Various modifications and alterations of this invention will be apparent to those skilled in the art without departing from the scope and spirit of this invention, and it should be understood that this is not limited to the illustrative embodiments set forth herein.

What is claimed is:

1. A shift range switching apparatus comprising:
    an actuator that outputs rotation of an electric motor;
    a detent plate that is pivoted by rotation output of the actuator;
    a detent spring that engages with any one of two or more recesses provided in the detent plate so as to fix a rotation position of the detent plate;
    a shift range switching mechanism that switches real shift ranges of an automatic transmission in accordance with a rotation position of the detent plate fixed by engagement between any one of the recesses provided in the detent plate and the detent spring;
    a detent position sensor that detects positional information corresponding to a rotation position of the detent plate;
    a real shift range determination means that determines a real shift range of the automatic transmission, based on positional information corresponding to a rotation position of the detent plate detected by the detent position sensor;
    a shift range setting means that outputs a demanded shift range corresponding to operation of a driver;
    a target shift range determination means that determines the target shift range to be a demanded shift range outputted from the shift range setting means; and
    an actuator control means that controls a rotation position of the detent plate by driving the actuator in such a way that a real shift range determined by the real shift range determination means coincides with a target shift range determined by the target shift range determination means, based on the positional information corresponding to the rotation position of the detent plate detected by the detent position sensor, the real shift range determined by the real shift range determination means, and the target shift range determined by the target shift range determination means,
    wherein when due to instantaneous interruption of a power source supplied to the shift range switching apparatus, the shift range switching apparatus is reactivated, the target shift range determination means determines a target shift range in accordance with a rotation position of the detent plate detected by the detent position sensor immediately after the reactivation.

2. The shift range switching apparatus according to claim 1, wherein the rotation position of the detent plate detected by the detent position sensor immediately after the reactivation is within a first range that is set closer to P Range (non-travel range with a parking lock operated) than to a rotation position range for R-Range (retreat travel range) determination, the target shift range determination means determines the target shift range to be P Range (retreat travel range).

3. The shift range switching apparatus according to claim 1, wherein the rotation position of the detent plate detected by the detent position sensor immediately after the reactivation is within a second range that is set closer to D Range (forward travel range) than to a rotation position range for N-Range (non-travel range) determination, the target shift range determination means determines the target shift range to be D Range (forward travel range).

4. The shift range switching apparatus according to claim 1, wherein the rotation position of the detent plate detected by the detent position sensor immediately after the reactivation is within a third range that is set between a predetermined rotation position range for R-Range (retreat travel range) determination and a rotation position range for N-Range (non-travel range) determination, the target shift range determination means determines the target shift range to be N Range (non-travel range).

5. The shift range switching apparatus according to claim 4, wherein the rotation position of the detent plate detected by the detent position sensor immediately after the reactivation is continuously within a predetermined rotation position range for R-Range (retreat travel range) determination for a predetermined time, the target shift range determination means determines the target shift range to be R Range (retreat travel range) in preference to N Range (non-travel range).

6. A shift range switching apparatus comprising:
an actuator that outputs rotation of an electric motor;
a detent plate that is pivoted by rotation output of the actuator;
a detent spring that engages with any one of two or more recesses provided in the detent plate so as to fix a rotation position of the detent plate;
a shift range switching mechanism that switches real shift ranges of an automatic transmission in accordance with a rotation position of the detent plate fixed by engagement between any one of the recesses provided in the detent plate and the detent spring;
a detent position sensor that detects positional information corresponding to a rotation position of the detent plate;
a real shift range determination means that determines a real shift range of the automatic transmission, based on positional information corresponding to a rotation position of the detent plate detected by the detent position sensor;
a shift range setting means that outputs a demanded shift range corresponding to operation of a driver;
a target shift range determination means that determines the target shift range to be a demanded shift range outputted from the shift range setting means; and
an actuator control means that controls a rotation position of the detent plate by driving the actuator in such a way that a real shift range determined by the real shift range determination means coincides with a target shift range determined by the target shift range determination means, based on the positional information corresponding to the rotation position of the detent plate detected by the detent position sensor, the real shift range determined by the real shift range determination means, and the target shift range determined by the target shift range determination means,
wherein when due to instantaneous interruption of a power source supplied to the shift range switching apparatus, the shift range switching apparatus is reactivated and the rotation position of the detent plate detected by the detent position sensor immediately after the reactivation is within a first range that is set closer to P Range (non-travel range with a parking lock operated) than to a rotation position range for R-Range (retreat travel range) determination, the target shift range determination means determines the target shift range to be P Range (non-travel range with a parking lock operated),
wherein the rotation position of the detent plate detected by the detent position sensor immediately after the reactivation is within a second range that is set closer to D Range (forward travel range) than to a rotation position range for N-Range (non-travel range) determination, the target shift range determination means determines the target shift range to be D Range (forward travel range), and
wherein when the rotation position of the detent plate detected by the detent position sensor immediately after the reactivation is within a third range that is set between a predetermined rotation position range for R-Range (retreat travel range) determination and a rotation position range for N-Range (non-travel range) determination, the target shift range is determined to be N Range (non-travel range).

7. The shift range switching apparatus according to claim 6, wherein the rotation position of the detent plate detected by the detent position sensor immediately after the reactivation is continuously within a predetermined rotation position range for R-Range (retreat travel range) determination for a predetermined time, the target shift range determination means determines the target shift range to be R Range (retreat travel range) in preference to N Range (non-travel range).

* * * * *